Aug. 6, 1929.  L. P. DOTT ET AL  1,723,608
STONE PICKER
Filed July 11, 1927   2 Sheets-Sheet 2
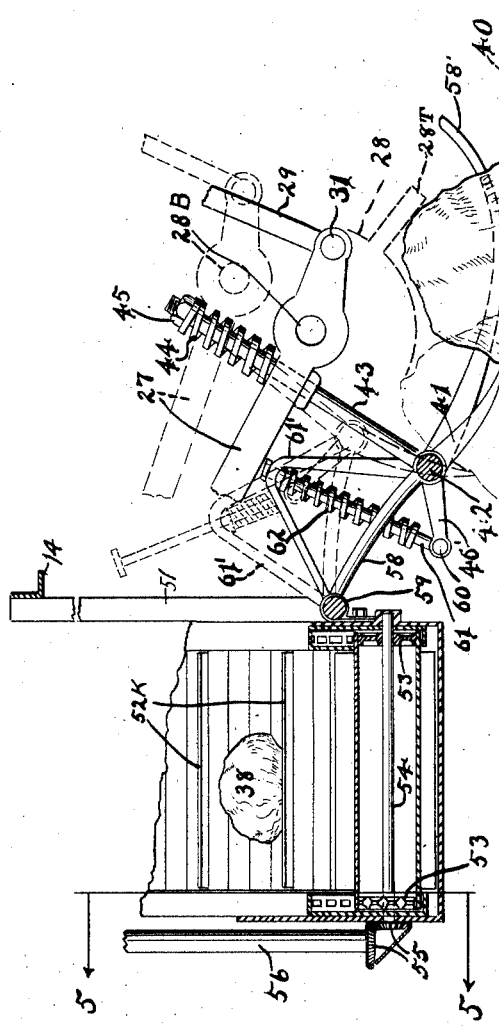
INVENTORS:
Lutallis P. Dott
Vern H. Ferries
BY David E. Carlsen
ATTORNEY.

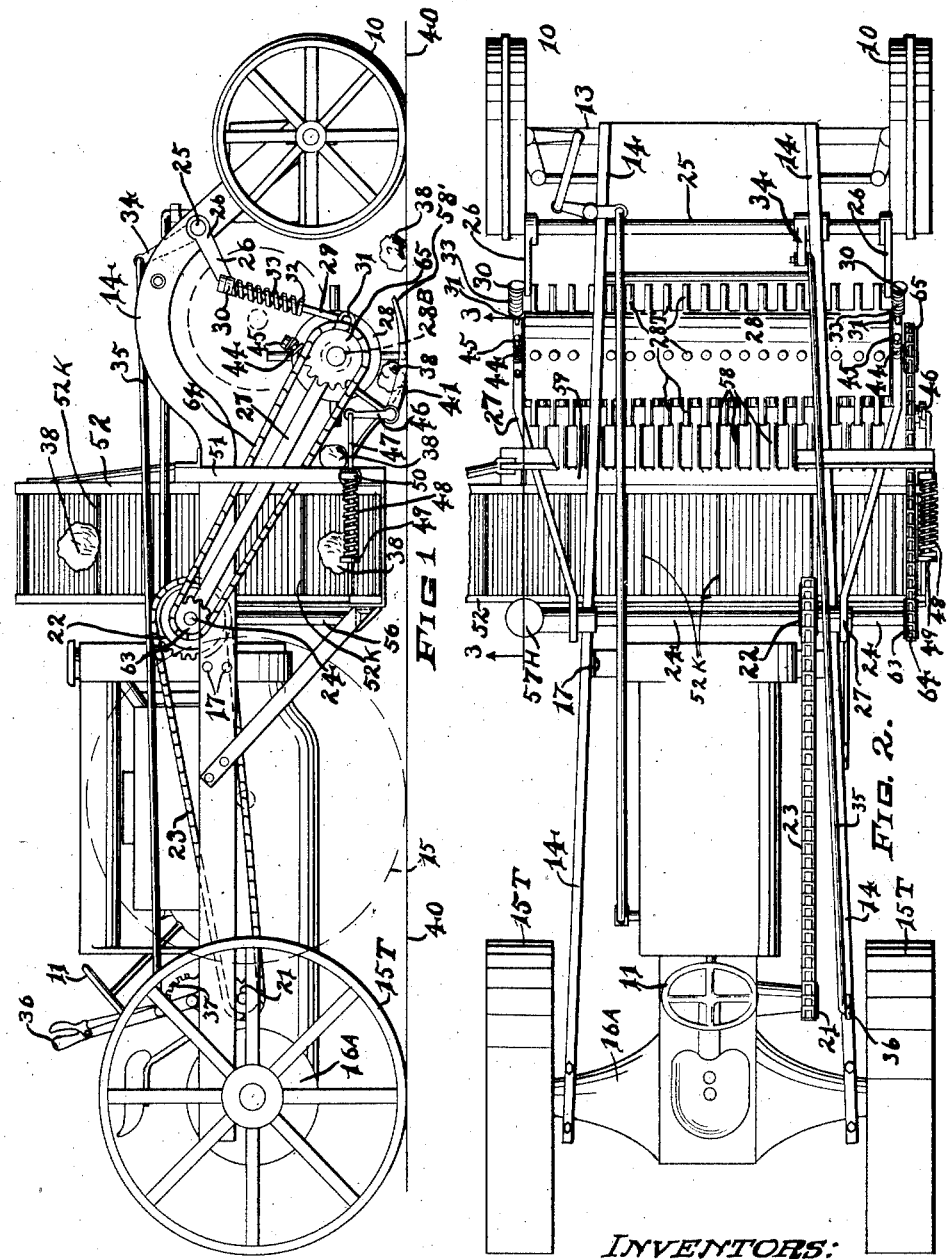

Patented Aug. 6, 1929.

1,723,608

UNITED STATES PATENT OFFICE.

LUTALLIS P. DOTT AND VERN H. FERRIES, OF WILTON, WISCONSIN.

STONE PICKER.

Application filed July 11, 1927. Serial No. 204,918.

Our invention relates to stone pickers, and the object is to provide a simple and highly efficient device adapted to pick up stones from the surface of the ground, thus increasing the value of the land by increasing its productive area. The picker is so designed that its stone-picking mechanism automatically raises and passes over large boulders, stumps, or other rigid obstructions. Further features and objects will appear in the following specification, reference being had to the accompanying drawing, in which:—

Fig. 1 is a side elevation of a tractor-driven type of our device.
Fig. 2 is a plan view of Fig. 1.

Fig. 3 is an enlarged vertical sectional view about as at line 3—3 in Fig. 2, illustrating the action of the stone picking means when striking and passing a large boulder.

Fig. 4 is a top view of a modified type of chassis for our device, particularly adapted as a horse drawn device.

Fig. 5 is a detailed view about as on line 5—5 in Fig. 3, showing mainly the belt carrier means.

Referring to the drawings by reference numerals, 10 designates the front and steering wheels, which, in the motor driven form of my device, are turned by a steering wheel 11 suitably connected to said wheels, while in the horse drawn type a draft pole 12 governs the turning of said wheels. 13 is the axle of the front wheels and supports the front ends of two longitudinal main frame members 14, the rear ends of which are supported by traction wheels 15 on an axle 16 (as in Fig. 4), or the traction wheels 15T and axle 16A of a gas-tractor as in Figs. 1 and 2.

In Figs. 1 and 2 is shown a gas-tractor with front wheels removed and its front end suitably fixed as at 17 between the frame members 14; the traction wheels 15T comprising the driving means of our device. When our device is of the horse drawn type, the frame may be shortened and the rear wheels 15 may be located about as shown dotted in Fig. 1, the mechanisms of our de-
vice in the latter case being driven by a bevel gear 18 fixed to one wheel 15 and meshing with a bevel pinion 19 on a shaft 20 journaled in the frame, which in turn transmits power to means hereinafter to be described.

21 is a chain drive gear fixed to the other bull wheel 15, and driving a pinion 22 by a chain 23, said pinion 22 mounted on a countershaft, 24 mounted transversely on the frame and comprising further driving means for certain mechanisms of our device. In Figs. 1 and 2, these latter parts include a drive gear 21 on a power shaft extending from one side of the transmission housing of the tractor.

25 is a transversely mounted rockshaft in the front part of the machine, and from which project rearwardly two downwardly directed lever arms 26 from which is oscillatably suspended the front end of a rock-kicker frame comprising two opposite side bars 27, each pivotally engaging shaft 24 with its rear end and externally of the main frame bar 14, extending angularly forwardly and their front ends comprising the end bearings 28B of a rock-kicker drum 28, said drum being of course, transverse of the frame and held suspended close to the ground. The suspending means comprises a hanger rod 29 for each arm 26 and slidably connected to said arm as in a rotable bearing 30, the lower end of each bar being pivotally connected as at 31 to the front end of a bar 27. 33 is a compression coil spring about the upper part of each rod 29 and its lower end engaged by a collar 32 on said rod. 34 is a lever fulcrumed on shaft 25 and from which a reach rod 35 extends rearwardly and is connected to a hand lever 36 within reach of the driver and engageable with a ratchet 37. It is obvious that the kicker drum is thus adjustable to any desired height, but in operation, said drum is held normally at such height that its rows of teeth 28T will engage rocks lying on the ground and throw them rearwardly.

38 are rocks of such size as can readily be picked up by our device and 39 in Fig. 3 is a boulder projecting above the ground line 40, but too large to be lifted. It is obvious that when the kicker teeth 28T engage such rock, they will ride over it and raise cylinder 28 and frame 27 as indicated in dotted lines.

41 is a rake comprising forwardly and downwardly directed teeth fixed on a rock shaft or transverse bar 42 suspended from the tiltable frame bars 27 by two upright end bars or rods 43 projecting one through each bar 27 and having each a coil spring 44 about it between said bar 27 and an end nut, 45, and under compression. 46 is a vertical arm at each end of rake 41, to which is pivotally secured the front end of a tension bar 47 carrying a coil spring 48 under compression at its rear end and between an end nut 49 and a collar 50 fixed on a depending frame bar 51.

52 is an endless belt conveyor suitably fixed transversely in the machine and having a horizontal part under the main frame and a continued upwardly inclined part for and behind the kicker drum 28 and for carrying stones to one side of the machine to be dropped into a wagon or other receptacle. Said belt has the usual drive chains 52, (Fig. 5), and cross cleats 52K, (Figs. 1 and 2), the lower run of said chain being driven by a sprocket 53 on a shaft 54 which in turn is driven by mitre gears 55, (Fig. 3), one of which is on a vertical shaft 56 extending further to a transmission housing 57 on frame 14, as in Fig. 4, or to a similar housing 57H in Fig. 2. In Fig. 2 is illustrated that power is transmitted from counter shaft 24 to housing 57H, thence through the parts described to move the conveyor, whereas in Fig. 4, power for the same purpose is transmitted through housing 57 from shaft 20 which is rotated by movement of the ground wheel 15.

58 is a bar grate extending rearwardly and upwardly from rock shaft 42 to another transverse shaft 59, parallel and adjacent the forward edge of the lower part of the conveyor. The opposite end bars of this grate are enlarged and extended forward of shaft 42 to form a runner 58', which is thus a support preventing the rake from digging into the ground.

The kicker drum 28 and its teeth 28T are rotated so that the said teeth will engage all rocks on the surface 40, and immediately in front of the rake teeth 41, the R. P. M.'s of said drum being calculated to be such that the rocks will be impelled upwardly and rearwardly past rake 41, over grate 58 and fall on the horizontal part of the conveyor.

In Fig. 3, arm 46' of the rake is normally rearwardly directed, its rear end pivotally connected at 60 to an upright compression bar 61, the upper end of which is slidably secured in the apex of an inverted V-shaped yoke 61', connecting rake shaft 42 and rear grate shaft 59. 62 is a compression coil spring about said bar and further compressed upwardly if rake 41 hits a solid object as 39, and thus tilting shaft 42 upwardly as in Fig. 3, all said parts automatically being sprung back to operative position after riding over the obstacle.

The means for driving the kicker drum may be varied, but we have shown a drive sprocket 63 on countershaft 24 driving a chain 64 driving another sprocket 65 fixed on one end of the drum shaft 28B.

The use and operation of our stone picker has been fully described in the foregoing specification.

We claim:

1. A stone picker comprising an elongated main frame supported on front steering wheels and rear wheels, a transversely mounted countershaft on said frame, an endless conveyor mounted transversely in said frame and having a horizontal upper run parallel to the ground; a rotary stone kicker device forward of said conveyor, a kicker frame pivoted on said countershaft and extending forwardly and downwardly therefrom and said kicker device rotatably mounted in the forward end of said kicker frame, means for raising and lowering said kicker frame, yieldable suspension means for the front end of said kicker frame, a transversely arranged rake with forwardly and downwardly directed teeth normally adapted to ride on the surface of the ground, a rearwardly and upwardly directed grate between said rake and the forward transverse edge of the horizontal part of the conveyor, means for rotating said countershaft and further means operated thereby to rotate the kicker device to engage and impel rocks on the ground rearwardly over said rake and grate and onto the upper run of the transverse conveyor adjacent the said grate, a transverse rake shaft pivotally retaining the rear ends of the rake teeth and simultaneously the front ends of the grate bars, and upwardly yieldable means fixed to said rake shaft and slidably engaging the kicker frame thereabove, said yieldable means comprising a number of upright rods each pivotally secured to said rake shaft with its lower end, its upper end extending slidably through and above a kicker frame side bar and a helical coil spring about said upright bar above said kicker frame bar, the lower end of said spring engaging the top of said frame bar and an adjustment nut threaded on the upper end of said bar and engaging the upper end of the spring.

2. The structure specified in claim 1 and an arm on the said rake extending rearwardly from the said rake shaft, an inverted V-shaped yoke in vertical plane above said arm, a rear grate shaft fixed transversely on the main frame, said yoke fixed with one end to said latter shaft and its other end to said rake shaft, a compression bar fixed pivotally to the free end of said rake arm and thence extending upwardly and slidably through the apex of said yoke, a compression coil spring about said bar adapted to be compressed upwardly and yieldably when the rake strikes an obstruction and is tilted thereby, and further adapted to spring the rake back to its original position.

In testimony whereof we affix our signatures.

LUTALLIS P. DOTT.
VERN H. FERRIES.